(12) United States Patent
Meyer

(10) Patent No.: US 9,277,691 B2
(45) Date of Patent: Mar. 8, 2016

(54) HYDRAULICALLY TILTING DUAL BALE SPEAR

(71) Applicant: Kyle Meyer, Holstein, IA (US)

(72) Inventor: Kyle Meyer, Holstein, IA (US)

(*) Notice: Subject to any disclaimer, the term of this patent is extended or adjusted under 35 U.S.C. 154(b) by 86 days.

(21) Appl. No.: 14/166,343

(22) Filed: Jan. 28, 2014

(65) Prior Publication Data

US 2014/0212244 A1 Jul. 31, 2014

Related U.S. Application Data

(60) Provisional application No. 61/757,782, filed on Jan. 29, 2013.

(51) Int. Cl.

| | | |
|---|---|---|
| *E02F 9/00* | (2006.01) |
| *B66F 9/12* | (2006.01) |
| *A01D 87/00* | (2006.01) |
| *A01D 87/12* | (2006.01) |
| *A01F 15/00* | (2006.01) |
| *A01F 15/07* | (2006.01) |
| *E02F 3/36* | (2006.01) |
| *E02F 3/34* | (2006.01) |
| *E02F 3/815* | (2006.01) |
| *E02F 3/627* | (2006.01) |
| *E02F 3/76* | (2006.01) |

(52) U.S. Cl.
CPC .............. *A01D 87/127* (2013.01); *B66F 9/125* (2013.01); *E02F 3/3414* (2013.01); *E02F 3/3677* (2013.01); *E02F 3/627* (2013.01); *E02F 3/7618* (2013.01); *E02F 3/815* (2013.01); *Y10T 74/18944* (2015.01)

(58) Field of Classification Search
CPC ........... A01D 87/127; A01D 2087/128; B66F 9/125; B66F 9/143; B66F 9/06; B66F 9/065; B66F 9/148; B66F 9/19; E02F 3/345; E02F 3/3677; E02F 3/34; E02F 3/3405; E02F 3/3414; E02F 3/352; E02F 3/36; E02F 3/3604; E02F 3/627; E02F 3/7613; E02F 3/7618; E02F 3/815; E02F 3/8157; Y10T 403/7005
USPC ......... 172/265; 403/348; 414/24.5, 24.6, 639, 414/640, 641, 648, 69, 705, 722, 732, 740, 414/743, 910, 911
See application file for complete search history.

(56) References Cited

U.S. PATENT DOCUMENTS

| | | | | |
|---|---|---|---|---|
| 3,024,933 | A * | 3/1962 | Albert et al. ................... | 414/705 |
| 3,182,831 | A * | 5/1965 | Bergmann ..................... | 414/705 |
| 3,482,722 | A * | 12/1969 | Simovich ....................... | 414/641 |
| 4,024,970 | A * | 5/1977 | Schirer .......................... | 414/739 |
| 4,040,534 | A * | 8/1977 | Kenworthy .................... | 414/703 |

(Continued)

*Primary Examiner* — Gregory Adams
(74) *Attorney, Agent, or Firm* — Christopher A. Proskey; David M. Breiner; Camille L. Urban

(57) ABSTRACT

A hydraulically tilting dual bale spear having multiple bale tines is presented. The bale spear has a first frame and a second frame connected to one another at a pivot point. A hydraulic cylinder is positioned between the first frame member and the second frame member. When activated, the hydraulic cylinder tilts the second frame with respect to the first frame member thereby providing a safer, faster and more efficient way to gather and pick up bales. The benefit over a non-tilting dual bale spear is that it allows the operator to pick up two bales without stopping or dragging the first bale across the ground and ripping the net wrap. It also allows the operator to level out the two bales once picked up for easier off load onto a truck or trailer.

9 Claims, 7 Drawing Sheets

(56) References Cited

U.S. PATENT DOCUMENTS

| | | | |
|---|---|---|---|
| 4,095,714 A * | 6/1978 | Schuster | 414/607 |
| 4,281,721 A * | 8/1981 | Beales | 172/821 |
| 4,507,041 A * | 3/1985 | Church et al. | 414/641 |
| 4,533,290 A * | 8/1985 | Hackauf | 414/667 |
| 4,540,330 A * | 9/1985 | Taylor | B66F 9/125 414/422 |
| 4,778,330 A * | 10/1988 | Mailleux et al. | 414/629 |
| 5,096,363 A * | 3/1992 | Weinert et al. | 414/667 |
| 5,562,398 A * | 10/1996 | Knutson | 414/732 |
| 5,732,781 A * | 3/1998 | Chambers | 172/825 |
| 6,035,944 A * | 3/2000 | Neuner | E02F 3/815 172/818 |
| 6,360,459 B1 * | 3/2002 | Brookhart et al. | 37/442 |
| 7,351,028 B2 * | 4/2008 | Potter et al. | 414/723 |
| 7,789,612 B2 * | 9/2010 | Milani et al. | 414/620 |
| 8,065,823 B2 * | 11/2011 | Morrell | 37/254 |
| 8,167,528 B2 * | 5/2012 | Keeven | B66F 9/082 187/232 |

* cited by examiner

US 9,277,691 B2

HYDRAULICALLY TILTING DUAL BALE SPEAR

CROSS REFERENCE TO RELATED APPLICATION

This application claims the benefit of U.S. Provisional Application No. 61/757,782 filed Jan. 29, 2013.

FIELD OF THE INVENTION

This invention relates to a bale spear. More specifically, and without limitation, this invention relates to a mechanized laterally tilting dual bale spear used for gathering and picking up multiple round hay bales at once.

BACKGROUND OF THE INVENTION

Hay is an important feed for cows, horses, goats, and other ruminants. Traditionally, hay was harvested and stacked for drying by hand. However, since the industrial revolution, harvesting, baling and stacking hay has become increasingly more mechanized. Initially, mechanization was developed to bale hay in small rectangular hay bales. A major improvement in the hay baling art was the development of large round hay balers. These round balers collect cut hay from the ground, roll it to produce a round hay bale that is many times larger than traditional square bales. These round bales are quite efficient as the round baler compresses the harvested crop mat. Using a large round baler improves the efficiency of a baling operation as less bales are required, as compared to square bales, which reduces the amount of bales that must be made, moved or used While the development of large round hay bales is an improvement over the prior art, the use of large round hay bales presents certain problems. Namely, large round hay bales are heavy, dense and therefore they are difficult to pick up, move and control. In addition, due to the fact that often times hay is cut on more-marginal or variable land, using machinery to pick up and move large round bales on rolling or hilly terrain can be difficult, dangerous and inefficient. I addition, due to the fact that farming operations are growing and becoming more mechanized, it is becoming difficult to meet the efficiency and cost demands required by modern farming operations with conventional equipment.

Thus a primary object of the present invention is to provide a device that improves the efficiency of moving large round hay bales.

Another object of the present invention is to provide a device that improves the safety of moving large round hay bales.

Yet another object of the present invention is to provide a device that improves that amount of control a user has when moving large round hay bales.

Another object of the present invention is to provide a device that easily allows for more than one large round hay bale to be picked up and moved at a time.

Yet another object of the present invention is to provide a device that is simple and easy to use.

Another object of the present invention is to provide a device that is inexpensive.

Yet another object of the present invention is to provide a device that is rigid and durable while being adjustable.

These and other objects, features, or advantages of the present invention will become apparent from the specification, drawings and claims.

BRIEF SUMMARY OF THE INVENTION

A hydraulically tilting dual bale spear having multiple bale tines is presented. The bale spear has a first frame and a second frame connected to one another at a pivot point. A hydraulic cylinder is positioned between the first frame member and the second frame member. When activated, the hydraulic cylinder tilts the second frame with respect to the first frame member thereby providing a safer, faster and more efficient way to gather and pick up bales. The benefit over a non-tilting dual bale spear is that it allows the operator to pick up two bales without stopping or dragging the first bale across the ground and ripping the net wrap. It also allows the operator to level out the two bales once picked up for easier off load onto a truck or trailer.

DETAILED DESCRIPTION OF THE PREFERRED EMBODIMENT

Figure 1:
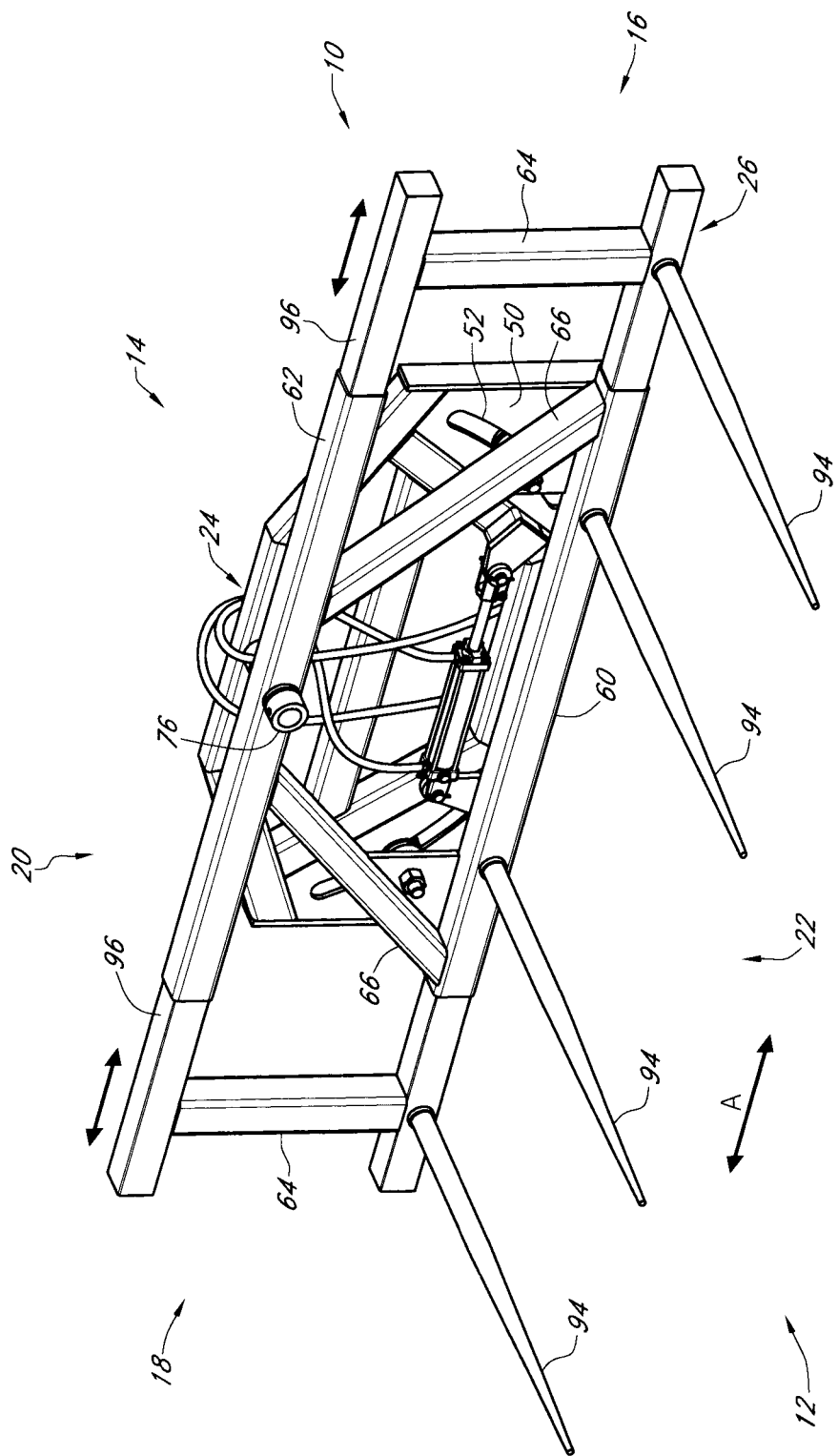
FIG. 1 is a front perspective view of a hydraulically tilting dual bale spear.
Figure 2B:
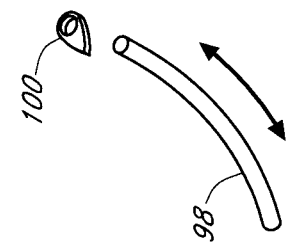
FIG. 2B is a front perspective view of a second alternative embodiment of a guiding member in the form of a curved rail and a follower to replace the cam slot in FIG. 1.
Figure 2A:
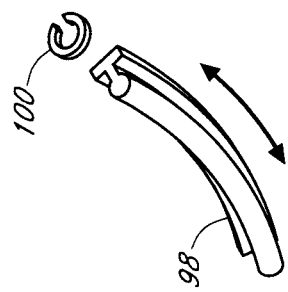
FIG. 2A is a front perspective view of a first alternative embodiment of a guiding member in the form of a curved rod and a follower to replace the cam slot in FIG. 1.
Figure 3:
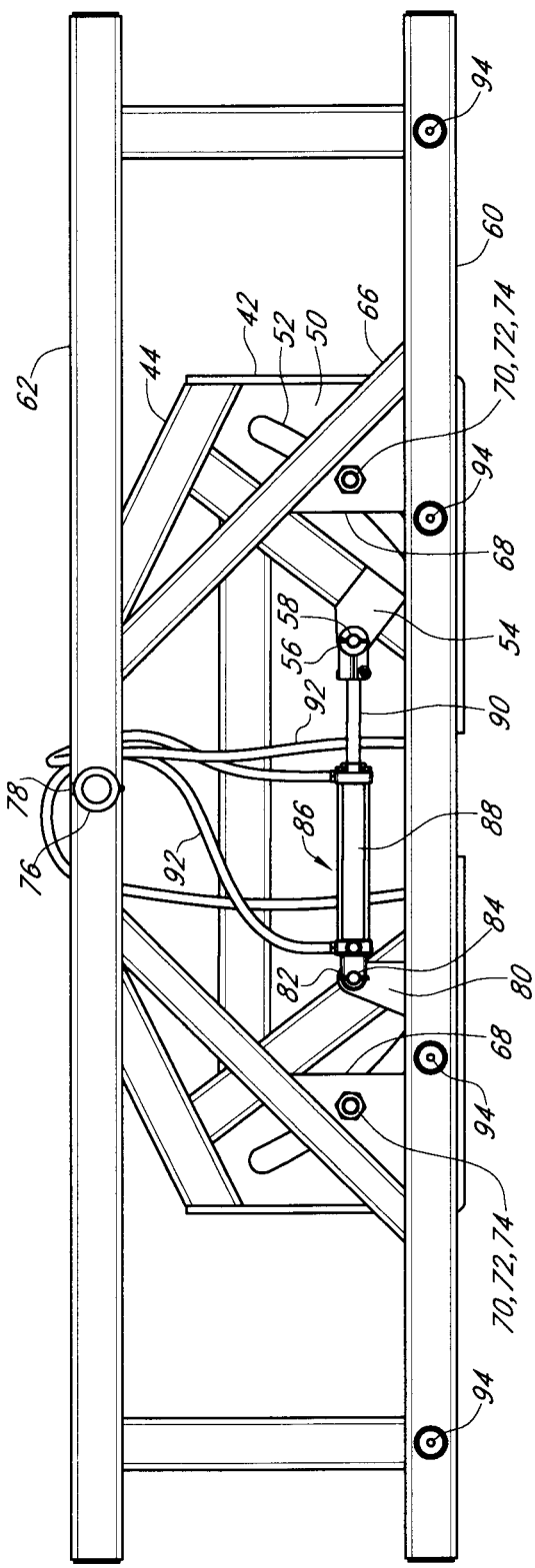
FIG. 3 is a front elevation view of a hydraulically tilting dual bale spear.
Figure 4:
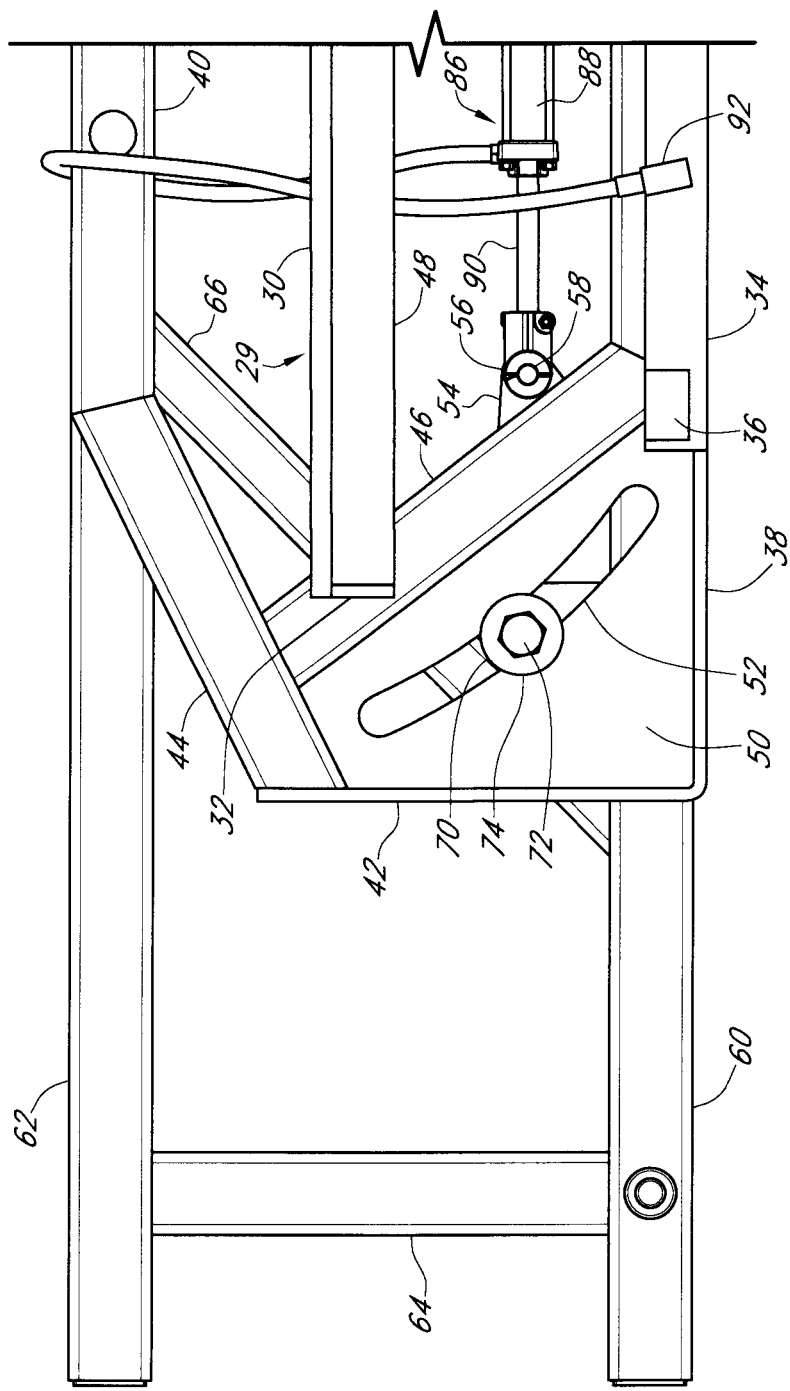
FIG. 4 is a partial rear elevation view of a hydraulically tilting dual bale spear.
Figure 5:
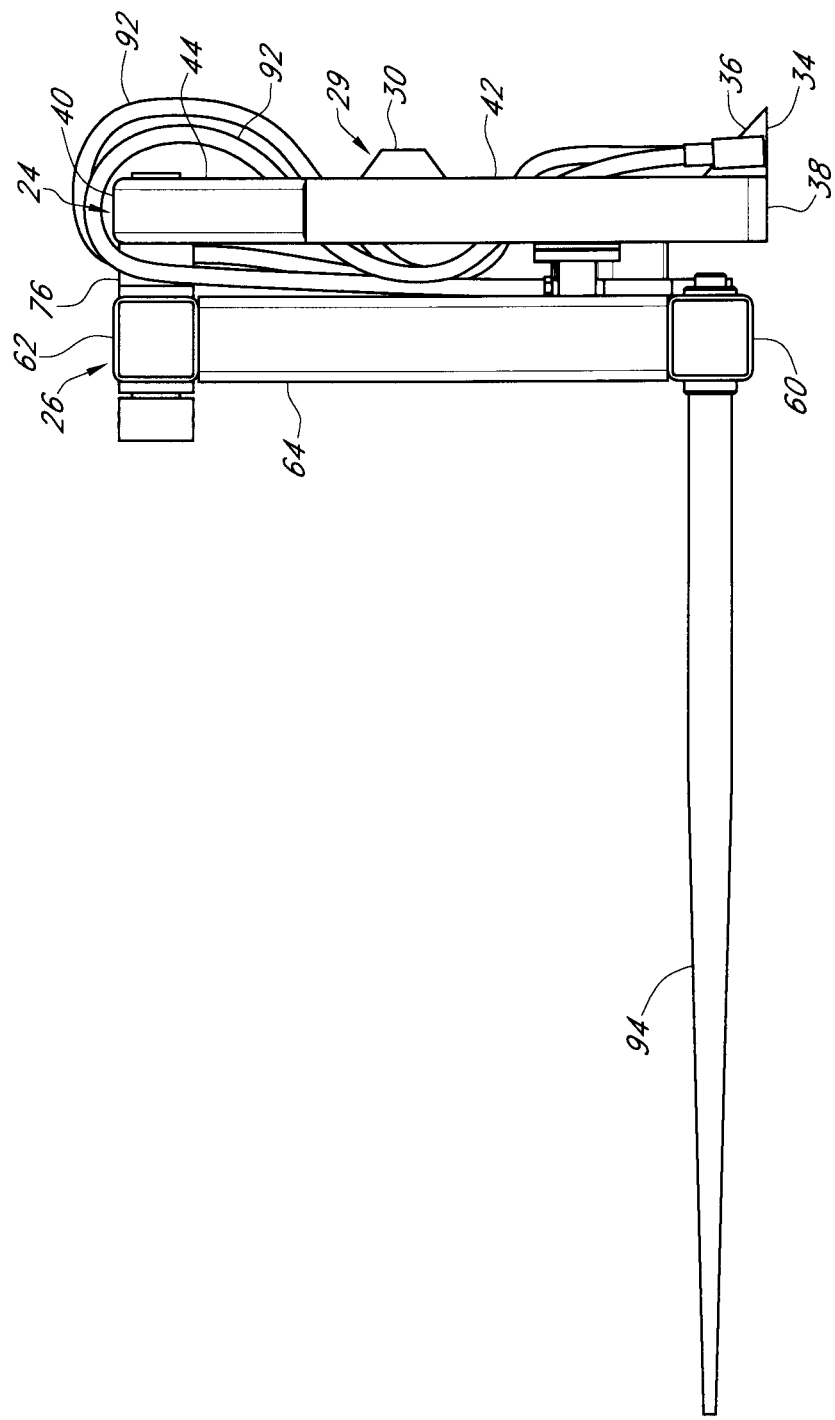
FIG. 5 is a side elevation view of a hydraulically tilting dual bale spear.
Figure 6:
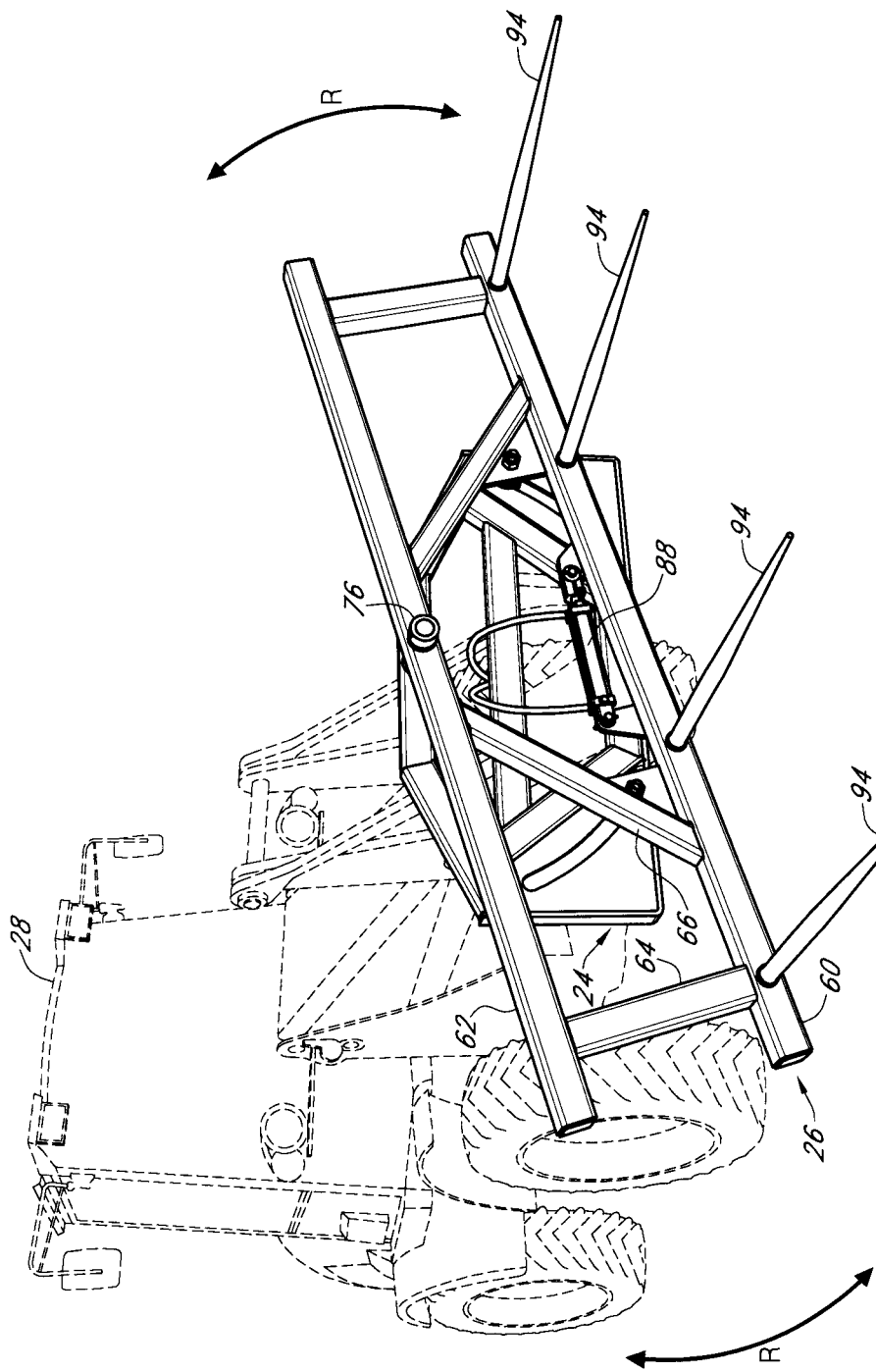
FIG. 6 is a front perspective view of a hydraulically tilting dual bale spear attached to a tractor wherein the right side of the hydraulically tilting dual bale spear is tilted all the way down.
Figure 7:
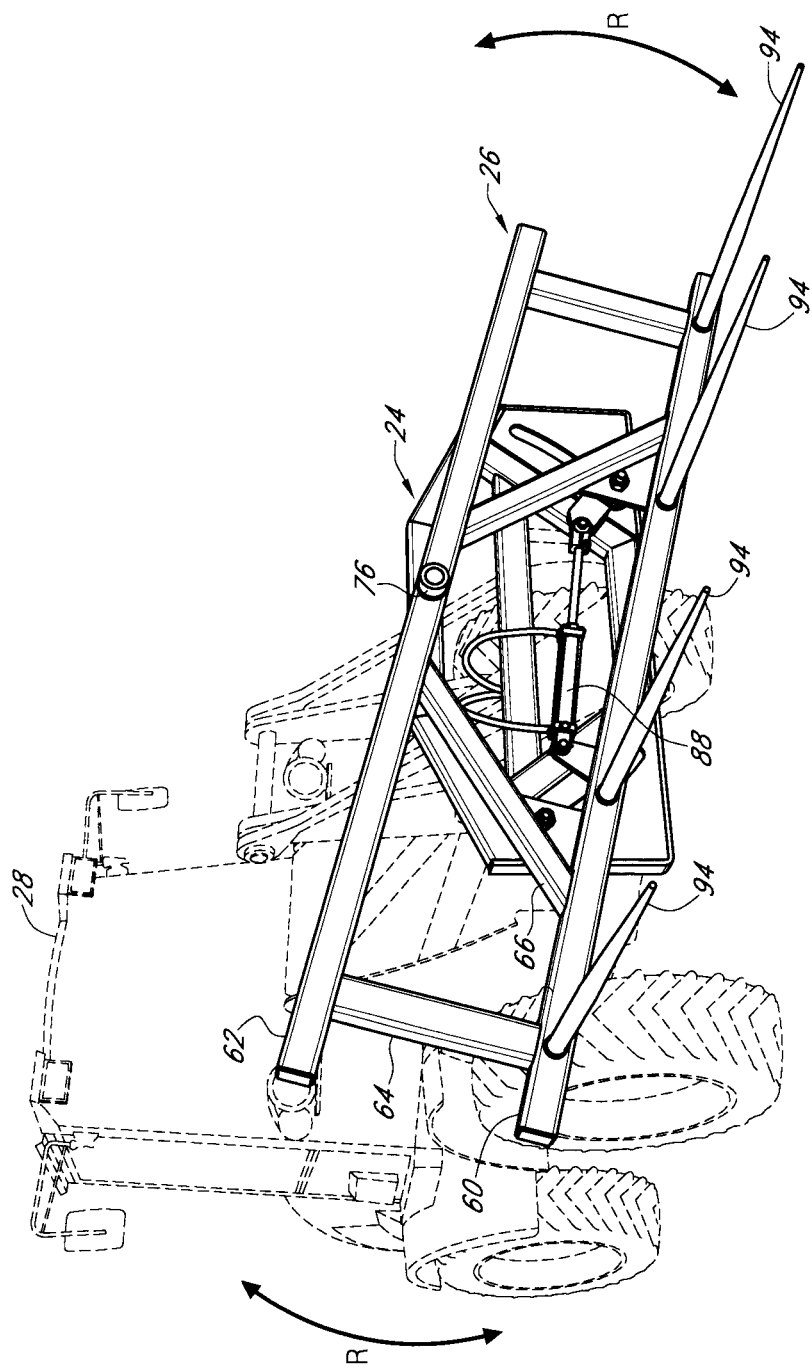
FIG. 7 is a front perspective view of a hydraulically tilting dual bale spear attached to a tractor wherein the left side of the hydraulically tilting dual bale spear is tilted all the way down.

With reference to the figures, a hydraulically tilting dual bale spear 10 is presented. While the figures and the description show and discuss a dual bale spear, the invention is not so limited. It is hereby contemplated that the invention herein is equally applicable to a triple bale spear, a quadruple bale spear, and so on without limit. The bale spear 10 a front side 12, a back side 14, a left side 16, a right side 18, a top side 20 and a bottom side 22. The bale spear 10 has two main components, a first frame 24 and a second frame 26. The term tilting mechanism is used to describe the components that work in unison with one another to connect first frame 24 with second frame 26 while allowing second frame to angularly tilt from side-to-side with respect to the first frame 24. The tilting mechanism cause tilting, guide tilting, facilitate tilting, while providing needed strength and rigidity to the system 10 to facilitate its intended purpose of lifting, carrying and manipulating bales and other objects.

First frame 24 connects to a tractor, wheel loader 28 or other piece of machinery, equipment, vehicle or the like. First frame 24 connects to tractor 28 by any means known in the art such as through an attachment, a Bob-Tach™, Quick-Tach™, or any other connecting arrangement. In embodiment pictured, a Quick-Tach™ attachment mechanism 29 is presented having an upper lip 30 which angles downwardly, a sidewall 32 connected to each side of the upper lip 30 which provides the outside boundary of the upper lip 30 and a lower lip 34 which also angles downwardly. Lower lip 34 has a pair of locking holes 36, one in either side of the lower lip 34 which receive locking members from the attachment system of wheel loader 28.

First frame member 24 has a bottom frame member 38 and an opposing upper frame member 40 which are connected to one another at each outward side by opposing side frame members 42 thereby a rigid and generally square or rectangular first frame member 24 is formed. In one arrangement the bottom frame member 38, upper frame member 40 are positioned in parallel spaced alignment to one another; the side frame members 42 are positioned in parallel spaced alignment to one another; and the side frame members 42 are positioned in perpendicular alignment to the bottom frame member 38 and upper frame member 40, thereby forming a generally square or rectangular frame. So as to improve the aesthetics of the first frame member 24 as well as to allow for better visibility when bale spear 10 is tilted, the upper corners of the first frame member 24 are replaced with a corner frame member 44 which is positioned at an angle to the upper frame member 40 and side frame members 42 thereby eliminating the squared upper corners of first frame 24.

A pair of opposing angled cross braces 46 are positioned within the open interior of the first frame member 24. Angled cross braces 46 are connected at their bottom edge to the top surface of bottom frame member 38 and angle outwardly therefrom where they connect at their top edge to the bottom side of upper frame member 40. Alternatively, angled cross braces 46 connect at their top edge to upper frame member 40, side frame member 42; or at the intersection of upper frame member 40 and side frame member 42, the intersection of upper frame member 40 and corner frame member 44 or the intersection of side frame member 42 and corner frame member 44.

Also positioned within the opening of first frame member 24 to provide additional rigidity and strength is longitudinal cross brace 48. In one arrangement, longitudinal cross brace 48 extends in parallel spaced alignment to the upper frame member 40 and bottom frame member 38 and connects at its outward edges to angled cross braces 46, adjacent their top edge. Alternatively, longitudinal cross braces 48 connects at its outward edge to, side frame member 42, corner frame member 44; or at the intersection of side frame member 42 and corner frame member 44. The upper lip 30 and sidewalls 32 of the attachment mechanism 29 are connected to the back side 14 of the longitudinal cross brace 48 and extend rearward therefrom. Similarly, the lower lip 34 of the attachment mechanism 29 is connected to the back side of the bottom frame member 38 and extend rearward therefrom.

Additional frame members can be connected to first frame member 24 to improve the rigidity and strength thereof without departing from the scope of the invention and are hereby contemplated.

A cam plate 50 is positioned within the first frame member 24. In the arrangement shown, cam plate 50 is positioned in the bottom outside corners of the first frame member 24. That is, the cam plate 50 is positioned in the opening between the bottom frame member 40, the side frame member 42 and the angled cross brace 46. Depending on the arrangement, in the event that the first frame member 24 has corner frame members 44 the upper edge of the cam plate may 50 may connect to a portion of the corner frame members 44 as well (as is shown in the figures). In this arrangement, cam plate 50 is completely surrounded by frame members, thereby providing cam plate 50 with optimal strength and rigidity.

A cam slot 52 is positioned within each cam plate 50. In one arrangement, cam slot 52 is a portion of a circle which has a constant or even curvature. In another arrangement, cam slot 52 is any arcuate opening or feature.

First mounting bracket 54 is also connected to the first frame member 24. In the arrangement depicted, first mounting bracket 54 is connected to the front side 12 of angled cross brace 46 and is attached thereto adjacent the bottom edge of the angled cross brace 46. In the arrangement depicted, first mounting bracket 54 is a plate having a rectangular outside edge which terminates in a rounded nose 56 which points towards the center of the first frame member 24. Positioned within the rounded nose 56 is a through hole 58, which is used for attachment.

Second frame member 26 has a bottom frame member 60 and an opposing upper frame member 62 which are connected to one another at each side by opposing side frame members 64 thereby a rigid and generally square second frame member 26 is formed. In one arrangement the bottom frame member 60, upper frame member 62 are positioned in parallel spaced alignment to one another; the side frame members 64 are positioned in parallel spaced alignment to one another; and the side frame members 64 are positioned in perpendicular alignment to the bottom frame member 60 and upper frame member 64, thereby forming a generally square or rectangular frame.

A pair of opposing second frame cross braces 66 are positioned within the open interior of the second frame member 26. Second frame cross braces 66 are connected at their bottom edge to the top surface of bottom frame member 60 and angle inwardly therefrom where they connect at their top edge to the bottom side of upper frame member 62. Additional frame members can be connected to second frame member 26 to improve the rigidity and strength thereof without departing from the scope of the invention and are hereby contemplated, examples include the longitudinal cross brace 48 and corner frame members 44, described above.

A bushing plate 68 is positioned in the inside corner formed by bottom frame member 60 and second frame cross braces 66. The bottom edge of bushing plate 68 is connected to the upper edge of bottom frame member 60, and the outside edge of bushing plate 68 is connected to the inside edge of second frame cross braces 66. The interior edge of bushing plate 68 is not connected to an additional frame member (as is shown), however, for additional strength an additional frame member can be connected along this edge.

A through hole is positioned in the bushing plate and a bushing 70 is connected thereto by a conventional nut and bolt arrangement positioned in the opening between the bottom frame member 40, the side frame member 42 and the angled cross brace 46. Depending on the arrangement, in the event that the first frame member 24 has corner frame members 44 the upper edge of the cam plate may 50 may connect to a portion of the corner frame members 44 as well (as is shown in the figures). In this arrangement, cam plate 50 is completely surrounded by frame members, thereby providing cam plate 50 with optimal strength and rigidity.

Bushing 70 extends outwardly and rearward from bushing plate 68 and is matingly received within cam slot 52 of cam plate 50 of first frame 24. To ensure bushing 70 remains within cam slot 52, a washer 74 is positioned on either side of bushing 70 and cam plate 50. Alternatively, bushing 70 has a groove which matingly fits within cam slot 52 and shoulders which are wider than cam slot 52, thereby preventing bushing from escaping cam slot 52. Bushing 70 and cam slot 52 connect first frame member 24 to second frame member 26 while allowing side-to-side angular tilting of second frame member 26 with respect to first frame member 24.

Axel 76 connects upper frame member 40 of first frame member 24 to the upper frame member 62 of second frame member 26. Axel 76 is connected to and extends outwardly and forward from upper frame member 40 of first frame member 24 and passes through upper frame member 62 of second frame member 26 thereby pivotally connecting the two upper frame member 40, 62 to one another. In one arrangement, as is shown, axel 76 is received within a circular collar connected to second frame member 26 which allows second frame member 26 to rotate upon axel 76. To facilitate pivoting at this pivot point, axel 76 is generally located at the centers of the two upper frame member 40, 62, adjacent their centers. Axel 76 is held in place by a locking pin 78 positioned on the forward side of second frame member 26, thereby preventing axel 76 from withdrawing from second frame member 26. In one arrangement, axel 76 is positioned at the center of a circle formed by the curvature of cam slots 52. Axel 76 generally extends perpendicularly outwardly from the plane formed by second frame member 26 thereby providing an axis of rotation that is perpendicular to the plane of second frame member 26. As the plane of first frame member 24 is positioned in generally parallel spaced relation to the plane of the second frame member 24, the axis of rotation established by axel 76 is generally perpendicular to both the plane of the first frame member 24 and the second frame member 26.

Second mounting bracket 80 is also connected to the second frame member 26. In the arrangement depicted, second mounting bracket 80 is connected to the rear side 14 of bottom frame member 60 and extends upwardly therefrom. Second frame member 26 is positioned just inside the interior edge of bushing plate 68. In the arrangement depicted, second mounting bracket 80 is a plate having a rectangular bottom edge which terminates in a rounded nose 82 which points upwardly. Positioned within the rounded nose 82 is a through hole 84, which is used for attachment.

Hydraulic cylinder assembly 86 is connected at its first end to first mounting bracket 54 and at its second end to second mounting bracket 80. Hydraulic cylinder assembly 86 has a hydraulic cylinder 88 and a piston 90 which forcibly extends and retracts in and out of hydraulic cylinder 88. Hydraulic lines 92 are connected to hydraulic cylinder 88 to supply and return hydraulic fluid to hydraulic cylinder assembly 86. Hydraulic lines 92 are removeably and replaceably connected to the hydraulic system of wheel loader 28.

At least two pairs of bale tines 94 are connected to and extend outwardly and forward from the bottom frame member 60 of second frame member 26. Two bale tines 94 provide additional stability for the speared bale and prevents rotation of the bale. Additional tines 94 can be added to any portion of second frame member 26 such that three, for or more tines 94 are used to pick up a bale.

In one arrangement, an additional bale spear extends out of second frame cross brace 66 and/or the upper frame member 62 of second frame member 26. Bale tines 94 are positioned at fixed positions on second frame member 26, or alternatively bale tines 94 are manually or mechanically moveable and adjustable along second frame member 26. In the arrangement wherein tines 94 are mechanically moveable, additional hydraulic cylinders or electric motors are needed to facilitate their adjustment.

Due to the width of average roads the second frame member 26 can facilitate two adjacent conventional round bales. However, if a bale spear is needed to simultaneously lift three or more round bales, it is hereby contemplated that folding wings can be connected to the exterior edge of the second frame member. Folding wings are connected by a joint and are controllable by hydraulic cylinders or electric motors. When in transit, folding wings are in a folded condition, whereas when the tractor 28 reaches the field, and its width is no longer restricted, the wings are unfolded thereby allowing for picking up three or more bales.

Alternatively, to facilitate picking up more than two round bales simultaneously and/or to facilitate lateral adjustment of multiple bales after being picked up, the second frame member 26 has telescoping portions 96. These telescoping portions retract within one another and extend therefrom, to facilitate a width varying second frame member 26. This retraction and extension is accomplished by way of pneumatic or hydraulic cylinders, electric motors or any other movement mechanism. In one arrangement, as an example to facilitate this width extension and retraction, the second frame member 26 includes a narrower tube member that fits within a wider tube member such that the narrower tube member fits and slides within the wider tube member to adjust the width of the second frame member 26 along arrows A.

Alternative Arrangement: While cam plates 50 and cam slots 52 are shown and described herein as being part of first frame 24, and bushing plate 68 and bushing 70 are shown and described as being part of second frame 26, it is hereby contemplated to invert this arrangement. That is, in an alternative arrangement, the cam plates 50 and cam slots 52 are part of second frame 26, and bushing plate 68 and bushing 70 are part of first frame 24. This, either arrangement provides identical functionality, however there may be compelling reasons, based on specific applications, that makes one arrangement more desirable than the other.

Alternative Arrangement: While arcuate cam slots 52 with corresponding bushings 70 is presented as one manner of connecting first frame member 24 with second frame member 26 while allowing and guiding tilting of second frame member 26 with respect to first frame member 24, this is not the only manner of accomplishing this functionality. In an alternative arrangement, cam slots 52 are replaced with a straight or curved rod, shaft, rail or other guiding member 98. In this arrangement, a follower 100, such as a collar or the like replaces bushings 70. In this arrangement follower 100 fits over and slides along guiding member 98 as the second frame member 26 is tilted up or down. Accordingly, this arrangement of a guiding member 98 and follower 100 is a different structure than cam slots 52 and bushings 70 that provides a similar functionality. Like cam slots 52 and corresponding bushings 70, the guiding members 98 and corresponding followers 100 can be connected to either the first frame 24 or the second frame 26.

In operation: the dual bale spear 10 is connected to the tractor 28 by any conventional means. Hydraulic lines 92 of the hydraulic cylinder assembly 86 are connected to the hydraulic system of tractor 28. Once connected, the bale spear 10 is ready for use.

The operator controls the height and up/down tilting of the tines 94 by manipulating the implement arm of tractor 28 that bale spear is connected to. The user controls the side-to-side tilting of second frame member 26 by controlling the flow to hydraulic cylinder 88 which controls the distance at which piston 90 extends out of or into hydraulic cylinder 88. As the piston 90 extends out of hydraulic cylinder 88 the second frame 26 tilts one way with respect to first frame member 24; as the piston 90 retracts into hydraulic cylinder 88 the second frame 26 tilts the opposite way with respect to first frame member 24. In one arrangement, hydraulic cylinder 88 has pistons 90 that extend out of each end of the hydraulic cylinder 88. In this way, as a piston 90 extends out of one end of the hydraulic cylinder 88 the second frame 26 tilts one way (along arrow R); and as a piston 90 extends out of the other end of the hydraulic cylinder 88 the second frame 26 tilts the other way (along arrow R).

As the second frame 26 tilts with respect to first frame 24, the second frame pivots upon axel 76 and bushings 70 slide or roll along cam slots 52 of cam plate 50. Axel 76 and bushings 70 in cam slots 52 keep the plane of first frame member 24 in parallel spaced alignment with the plane of second frame member 26. In this way, second frame member 26 tilts side to side without interfering or hitting first frame member.

As the user approaches a first bale, the user centers a pair of tines, either right pair or left pair 94 on the bale. The user drives the tractor towards the bale, thereby piercing the tines 94 into the bale until the tines 94 are fully inserted into the bale. Tines 94 are fully inserted in the bale when the bale engages the front side of the second frame member 26. After the tines 94 are fully inserted in the bale, the operator using the loader controls raises the loader therefore lifting the first bale. Once raised, the operator tilts the side of second frame member 26 that the bale is on upwardly.

Moving on to the next bale, the operator positions the center of the pair of tines opposite the first bale with the bale to be picked up. The first bale being tilted upward allows the operator to pierce the second bale without dragging the first bale along the ground, which often results in tearing of the bale net wrap. Once the second bale has been fully engaged the operator using the loader controls can raise the loader therefore lifting both bales simultaneously.

Now that the operator has two bales lifted, using the loader controls, the bale spear can be tilted to a level position in which the bottom of both bales are parallel to surface in which they are being off-loaded. This adjustment allows flexibility to the operator to allow him to match the angle of the bales on frame member 26 to the angle of truck or trailer on to which they are being offloaded, thus allowing to simultaneously disengagement of both bales precisely and efficiently.

From the above discussion it will be appreciated that presented is a dual bale spear that improves the efficiency of moving large round hay bales; improves the safety of moving large round hay bales; improves that amount of control a user has when moving large round hay bales; easily allows for more than one large round hay bale to be picked up and moved at a time; provides a device that is simple and easy to use, that is inexpensive, durable and rugged.

It will be appreciated by those skilled in the art that other various modifications could be made to the device without parting from the spirit and scope of this invention. All such modifications and changes fall within the scope of the claims and are intended to be covered thereby.

What is claimed:

1. An implement, comprising:
a first frame member;
the first frame member defining a plane;
an attachment mechanism connected to the first frame member;
wherein the attachment mechanism facilitates connection of the implement to a piece of equipment;
a second frame member connected to the first frame member;
the second frame member defining a plane;
a plurality of tines connected to the second frame member and extending outwardly therefrom;
the plane of the first frame member positioned in approximate parallel spaced relation to the plane of the second frame member;
a tilting mechanism connecting the first frame member and the second frame member;
the tilting mechanism including an axle positioned at an upper portion of the first frame member and the second frame member, the axle positioned at approximately a middle of the first frame member and the second frame member, the axle providing a pivot point and an axis of rotation;
the tilting mechanism including at least two cam members, at least one cam member positioned on opposing sides of the axle;
wherein the cam members include a cam slot positioned in a cam plate that receive a bushing;
wherein the cam slots in the cam plates are connected to one of the first frame member or the second frame member, and the bushing is connected to the other of the first frame member or the second frame member;
wherein the cam members are positioned in a lower portion of the first frame member and second frame member;
wherein when the tilting mechanism is actuated the second frame member angularly tilts with respect to the first frame member;
wherein when the second frame member angularly tilts with respect to the first frame member the bushings ride within the cam slots of the cam plates;
wherein when the tilting mechanism is actuated the axle and the cam members keep the plane of the first frame member and the plane of the second frame member in approximate parallel spaced alignment.

2. The implement of claim 1 wherein the piece of equipment is a tractor, wheel loader or vehicle.

3. The implement of claim 1 wherein the tilting mechanism includes a pneumatic or hydraulic cylinder connected to the first frame member and the second frame member.

4. The implement of claim 1 wherein the second frame member includes telescoping portions that extend and retract the width of the second frame member.

5. The implement of claim 1 wherein the axis of rotation is positioned in approximate perpendicular alignment to the plane of the first frame member and the plane of the second frame member.

6. An implement, comprising:
a first frame member;
the first frame member defining a plane;
a second frame member;
the second frame member defining a plane;
the plane of the first frame member positioned in approximate parallel spaced relation to the plane of the second frame member;
wherein the second frame member is connected to the first frame member by a pivot point which provides an axis of rotation;
wherein the pivot point is positioned at an upper portion of the first frame member and the second frame member;
wherein the second frame member is connected to the first frame member by at least two cam members, at least one cam member positioned on opposing sides of the pivot point;
wherein the cam members include one or more guiding members with followers that slide along the guiding members;
wherein the guiding members are formed of a rod, shaft or rail;
wherein the guiding members are connected to one of the first frame member or the second frame member, and the followers are connected to the other of the first frame member or the second frame member an attachment mechanism connected to the first frame member;
wherein the attachment mechanism facilitates connection of the implement to a piece of equipment;
a plurality of tines connected to the second frame member and extending outwardly therefrom;
a tilting mechanism connected to the first frame member and the second frame member;
wherein the tilting mechanism is a pneumatic or hydraulic cylinder;
wherein when the tilting mechanism is actuated the second frame member angularly tilts with respect to the first frame member about the axis of rotation;
wherein when the tilting mechanism is actuated the pivot point and the cam members keep the plane of the first frame member and the plane of the second frame member in approximate parallel spaced alignment.

7. The implement of claim 6 wherein the second frame member includes telescoping portions that extend and retract the width of the second frame member.

8. An implement, comprising:
a first frame member;
the first frame member defining a plane;
a second frame member;
the second frame member defining a plane;
the plane of the first frame member and the second frame member positioned in approximate parallel spaced alignment;
an attachment mechanism connected to the first frame member;
wherein the attachment mechanism facilitates connection of the implement to a piece of equipment;
a plurality of tines connected to the second frame member and extending outwardly therefrom;
a tilting mechanism connected to the first frame member and the second frame member;
wherein the tilting mechanism includes an axle connecting the first frame member and the second frame member and forming a pivot point;
wherein the axle is positioned at an upper portion of the first frame member and the second frame member;
wherein the tilting mechanism includes two or more cam slots, wherein the cam slots receive a bushing;
wherein the bushings are connected to a bushing plate;
wherein the cam slots are positioned in a cam plate;
wherein the cam slots in the cam plates are connected to one of the first frame member or the second frame member, and the bushing plates are connected to the other of the first frame member or the second frame member;
wherein the cam plates and bushing plates are positioned adjacent a lower portion of the first frame member and second frame member;
wherein when the tilting mechanism is actuated the second frame member angularly tilts with respect to the first frame member about the pivot point and the axel, cam slots and bushings keep the plane of the second frame member in approximate parallel spaced alignment to the first frame member;
wherein when the second frame member angularly tilts with respect to the first frame member the bushings ride within the earn slots of the cam plates.

9. The implement of claim 8 wherein the second frame member includes telescoping portions that extend and retract the width of the second frame member.

* * * * *